US012744660B1

(12) United States Patent
Bin et al.

(10) Patent No.: US 12,744,660 B1
(45) Date of Patent: Sep. 22, 2026

(54) SYSTEM, METHOD, AND COMPUTER PROGRAM FOR BACKING UP A SENSITIVE FIELD IN A DATA OBJECT IN A STORAGE SYSTEM USING AN EXTERNAL BACKUP SYSTEM WITHOUT ENABLING THE EXTERNAL BACKUP SYSTEM TO VIEW THE DATA IN THE SENSITIVE FIELD

(71) Applicant: Odaseva Technologies SAS, Neuilly-sur-Seine (FR)

(72) Inventors: Sovane Bin, San Francisco, CA (US); Saddek Dekoum, Ris Orangis (FR); Remi Poujeaux, Rueil-Malmaison (FR); Arnaud Deronne, Castelnau le Iez (FR); Francois Lopitaux, San Carlos, CA (US); Arnaud Treps, Paris (FR)

(73) Assignee: Odaseva Technologies SAS, Neuilly-sur-Seine (FR)

( * ) Notice: Subject to any disclaimer, the term of this patent is extended or adjusted under 35 U.S.C. 154(b) by 311 days.

(21) Appl. No.: 18/072,258

(22) Filed: Nov. 30, 2022

(51) Int. Cl.
*H04L 9/08* (2006.01)

(52) U.S. Cl.
CPC ............ *H04L 9/0822* (2013.01); *H04L 9/085* (2013.01)

(58) Field of Classification Search
None
See application file for complete search history.

(56) References Cited

U.S. PATENT DOCUMENTS 6,642,946 B1 11/2003 Janes et al.
8,078,645 B2 12/2011 Singh
8,255,320 B1 8/2012 Seal et al.
8,667,273 B1 * 3/2014 Billstrom ............ G06F 21/6209 713/165
8,775,328 B1 7/2014 Abhyanker
9,268,587 B2 2/2016 Kruglick
9,288,184 B1 3/2016 Kvamme et al.
9,330,301 B1 5/2016 Ozog
9,769,131 B1 9/2017 Hartley et al.
9,794,064 B2 10/2017 Anderson et al.
9,990,511 B1 * 6/2018 Dreyfus ................ G06F 3/0619
10,142,349 B1 * 11/2018 Tomlin .................. H04L 63/101
(Continued)

FOREIGN PATENT DOCUMENTS

CA 2634576 A1 * 12/2008 .......... G06F 11/1458
WO 2022081408 4/2022

*Primary Examiner* — Rupal Dharia
*Assistant Examiner* — Shadi H Kobrosli
(74) *Attorney, Agent, or Firm* — Lessani Law Group, PC

(57) ABSTRACT

The present invention backs up a sensitive field in a data object in a storage system using an external backup system without enabling the external backup system to view the data in the sensitive field. The system sets up the sensitive field for backup by adding an encrypted field to a data object that includes the sensitive field, configuring access to the sensitive field and the encrypted field, creating an encrypted copy of the data in the sensitive field with an encryption key controlled by the data owner, and storing the encrypted copy in the encrypted field. The system backs up the sensitive field without enabling the external backup system to view the data in the sensitive field by sending the encrypted copy in the encrypted field to the external backup system, where the external backup system has no access to the encryption key controlled by the data owner.

10 Claims, 4 Drawing Sheets

(56) References Cited

U.S. PATENT DOCUMENTS 10,664,494 B2 5/2020 Ding et al.
11,055,123 B1 7/2021 Bin et al.
11,256,824 B2* 2/2022 Al-Mousa .......... G06F 21/6209
11,609,774 B2 3/2023 Bin et al.
12,032,718 B1 7/2024 Bin et al.
12,056,723 B1 8/2024 Bin et al.
12,229,099 B1 2/2025 Bin et al.
12,235,737 B1 2/2025 Bin et al.
2006/0150169 A1 7/2006 Cook et al.
2008/0016127 A1* 1/2008 Field .................. G06F 21/6218
2008/0049942 A1 2/2008 Sprunk et al.
2008/0162532 A1 7/2008 Daga
2008/0270444 A1 10/2008 Brodie et al.
2008/0310633 A1* 12/2008 Brown ..................... H04L 9/16 380/259
2009/0031230 A1 1/2009 Kesler
2010/0079460 A1 4/2010 Breeds et al.
2012/0059857 A1 3/2012 Jackson, Jr.
2012/0110566 A1 5/2012 Park
2012/0117558 A1 5/2012 Futty et al.
2012/0246472 A1* 9/2012 Berengoltz .......... H04L 9/0897 713/165
2012/0254197 A1 10/2012 Kuzmin
2012/0324242 A1 12/2012 Kirsch
2013/0191780 A1 7/2013 Holmes et al.
2013/0227703 A1 8/2013 Sotos et al.
2013/0246451 A1 9/2013 Kaiser
2013/0283060 A1 10/2013 Kulkarni et al.
2013/0297769 A1 11/2013 Chang et al.
2014/0040182 A1 2/2014 Gilder et al.
2014/0040196 A1 2/2014 Wijayaratne et al.
2014/0040197 A1 2/2014 Wijayaratne et al.
2014/0101438 A1 4/2014 Elovici et al.
2014/0143661 A1 5/2014 Carreno-Fuentes et al.
2014/0278534 A1 9/2014 Romeo
2014/0344778 A1 11/2014 Lau et al.
2015/0019858 A1 1/2015 Roth et al.
2016/0019233 A1 1/2016 Wijayaratne et al.
2016/0098568 A1* 4/2016 Bushman ............... G06F 3/067 713/189
2016/0147999 A1 5/2016 Fontanetta et al.
2016/0156671 A1 6/2016 Cabrera et al.
2016/0197962 A1 7/2016 Winn et al.
2016/0277374 A1 9/2016 Reid et al.
2016/0308855 A1 10/2016 Lacey et al.
2017/0025040 A1 1/2017 Maturana et al.
2017/0048252 A1 2/2017 Straub et al.
2017/0091293 A1 3/2017 Cummings et al.
2017/0249656 A1 8/2017 Gantner et al.
2018/0081905 A1 3/2018 Kamath et al.
2018/0089270 A1 3/2018 Qiu et al.
2018/0150476 A1 5/2018 Koos et al.
2018/0176117 A1 6/2018 Gudetee et al.
2018/0181613 A1 6/2018 Acharya et al.
2018/0232402 A1 8/2018 Bhatti et al.
2018/0336209 A1 11/2018 Burshteyn
2018/0375838 A1* 12/2018 Hersans ............. G06F 21/6218
2019/0007206 A1 1/2019 Surla et al.
2019/0034509 A1 1/2019 Ding et al.
2019/0042988 A1 2/2019 Brown et al.
2019/0050925 A1 2/2019 Hodge et al.
2019/0303270 A1 10/2019 Hoermann
2020/0026532 A1 1/2020 Bill et al.
2020/0067772 A1 2/2020 Tomkins et al.
2020/0073854 A1 3/2020 Wijayaratne et al.
2020/0082890 A1 3/2020 Karr et al.
2020/0104478 A1 4/2020 Chauhan
2020/0127937 A1 4/2020 Busick et al.
2020/0159700 A1 5/2020 Wijayaratne et al.
2020/0183906 A1 6/2020 Spillane et al.
2020/0226953 A1 7/2020 Anand et al.
2020/0336481 A1 10/2020 Fan et al.
2020/0342117 A1* 10/2020 Richards ............... G06F 16/122
2020/0387625 A1* 12/2020 Saad .................. G06F 21/6227
2020/0394317 A1* 12/2020 White ....................... H04L 9/14
2021/0026982 A1* 1/2021 Amarendran ....... G06F 21/6254
2021/0049029 A1 2/2021 Kumble et al.
2021/0067324 A1 3/2021 Valente et al.
2021/0191629 A1* 6/2021 Vibhor ................. G06F 3/0659
2021/0255991 A1 8/2021 Koos et al.
2021/0255992 A1 8/2021 Wijayaratne et al.
2021/0349580 A1 11/2021 Dentzer
2021/0365414 A1 11/2021 Lu et al.
2021/0365587 A1 11/2021 Lu et al.
2022/0067115 A1 3/2022 Zheng et al.
2022/0107826 A1 4/2022 Bin et al.
2022/0129804 A1 4/2022 Dooley et al.
2022/0148084 A1 5/2022 Baker
2022/0188334 A1 6/2022 Chen
2022/0207489 A1 6/2022 Gupta et al.
2022/0263657 A1* 8/2022 Chang .................. G06F 21/602
2022/0269809 A1* 8/2022 Chopra ................ H04L 9/0894
2022/0317831 A1 10/2022 Karis et al.
2023/0010219 A1 1/2023 Howley et al.
2023/0082010 A1 3/2023 Clifford et al.
2023/0130457 A1 4/2023 Zhang
2023/0145349 A1 5/2023 Watari
2023/0237034 A1 7/2023 Garg et al.
2023/0281305 A1 9/2023 Savry et al.
2023/0315694 A1 10/2023 Koos et al.
2023/0325360 A1 10/2023 Wijayaratne et al.
2024/0012921 A1 1/2024 Yannuzzi et al.
2024/0020414 A1 1/2024 Burns
2024/0045811 A1* 2/2024 Gurin ........................ H04L 9/14
2024/0064020 A1 2/2024 Kiraz et al.
2024/0220656 A1 7/2024 Nozawa et al.
2025/0165357 A1 5/2025 Bin et al.

* cited by examiner

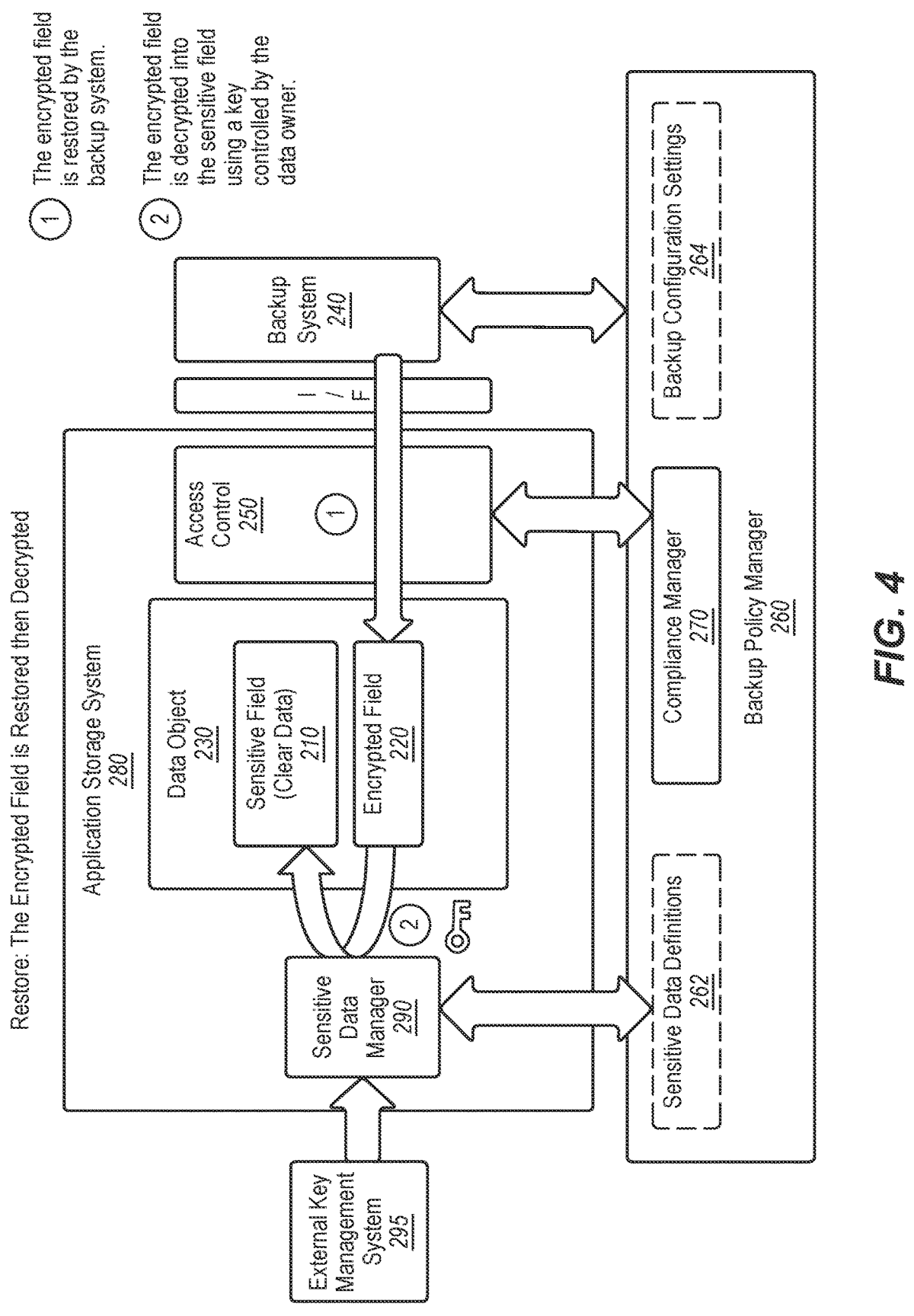

Restore: The Encrypted Field is Restored then Decrypted

1 The encrypted field is restored by the backup system.

2 The encrypted field is decrypted into the sensitive field using a key controlled by the data owner.

Application Storage System 280

Data Object 230

Sensitive Field (Clear Data) 210

Encrypted Field 220

Access Control 250

1

I/F

Backup System 240

Sensitive Data Manager 290

2

External Key Management System 295

Sensitive Data Definitions 262

Compliance Manager 270

Backup Configuration Settings 264

Backup Policy Manager 260

FIG. 4

SYSTEM, METHOD, AND COMPUTER PROGRAM FOR BACKING UP A SENSITIVE FIELD IN A DATA OBJECT IN A STORAGE SYSTEM USING AN EXTERNAL BACKUP SYSTEM WITHOUT ENABLING THE EXTERNAL BACKUP SYSTEM TO VIEW THE DATA IN THE SENSITIVE FIELD

BACKGROUND OF THE INVENTION

1. Field of the Invention

This invention relates generally to computer storage systems and, more specifically, to a system and method for backing up a sensitive field in a data object in a storage system using an external backup system without enabling the external backup system to view the data in the sensitive field.

2. Description of the Background Art

In the digital age, large quantities of data are stored in computer storage systems. While some data may be ordinary, much of the data, whether owned by individuals or entities, have sensitive information. While the data owner may want to back up their data in order to later restore the data, for example, in situations of system failure, the data owner may also be reluctant to give data access to third parties, including backup systems, in order to reduce the exposure surface. Therefore, there is a need for a system and method for backing up sensitive data in a storage system using an external backup system without enabling the external backup system to view the sensitive data. Finally, the data owner would like to have such functionality with no impact on his or her user experience.

SUMMARY OF THE DISCLOSURE

The present disclosure describes a system, method, and computer program for backing up a sensitive field in a data object in a storage system using an external backup system without enabling the external backup system to view the data in the sensitive field. The method is performed by a computer system that includes servers, storage systems, networks, operating systems, and databases.

The present invention provides a system and method for ensuring that access to highly confidential data is restricted while ensuring that the storage system is still able to back up and restore the data. This is done by storing the highly confidential data in two fields. The first field has clear data, but access to the field is restricted to the data owner's employees. All existing operations are not impacted and, as a result, there is no impact on the user experience. The other field has encrypted data for backup purposes, which the storage system sends to an external backup system such that the external backup system only sees the encrypted data. When restoring the data, the external backup system sends the encrypted data back to the storage system before decryption. The external backup system has no access to the encryption key as the encryption key is managed by the data owner and provided to the storage system, as needed.

In one embodiment, a method for backing up a sensitive field in a data object in a storage system using an external backup system without enabling the external backup system to view the data in the sensitive field comprises the following steps:

setting up the sensitive field for backup by performing the following:
- adding an encrypted field to a data object that includes the sensitive field;
- configuring access to the sensitive field and the encrypted field such that: (1) access to the sensitive field is allowed only to the data owner and denied to the external backup system; and (2) read and write access to the encrypted field is granted to the external backup system;
- creating an encrypted copy of the data in the sensitive field with an encryption key controlled by the data owner;
- storing the encrypted copy in the encrypted field; and backing up the sensitive field without enabling the external backup system to view the data in the sensitive field by sending the encrypted copy in the encrypted field to the external backup system, wherein the external backup system has no access to the encryption key controlled by the data owner.

BRIEF DESCRIPTION OF THE DRAWINGS

FIG. 4 is a block diagram that illustrates an example system architecture, according to one embodiment, for restoring and decrypting the encrypted field.

DETAILED DESCRIPTION OF THE PREFERRED EMBODIMENTS

The present disclosure describes a system, method, and computer program for backing up a sensitive field in a data object in a storage system using an external backup system without enabling the external backup system to view the data in the sensitive field. The method is performed by a computer system that includes servers, storage systems, networks, operating systems, and databases ("the system").

As described herein, an application refers to a client/server application, such as SALESFORCE or MICROSOFT AZURE. Sensitive data refers to highly confidential data (e.g., a field, a record, a file, etc.) A sensitive field is a field storing sensitive data. It should not be directly readable by a third-party application and/or backup system. An encrypted field is a field that stores the result of the sensitive field encryption. A user interface provides access to the client side of an application. A third-party application is an application that accesses data through an API/interface. An interface is a way to expose data to a third-party application. A backup is the scenario in which a third-party application gets a copy of data to be able to restore the data in case of data loss.

Example implementations of the methods are described in more detail with respect to FIGS. 1-4.

1. Method for No-View Backup and Restore for Sensitive Data

Figure 1:
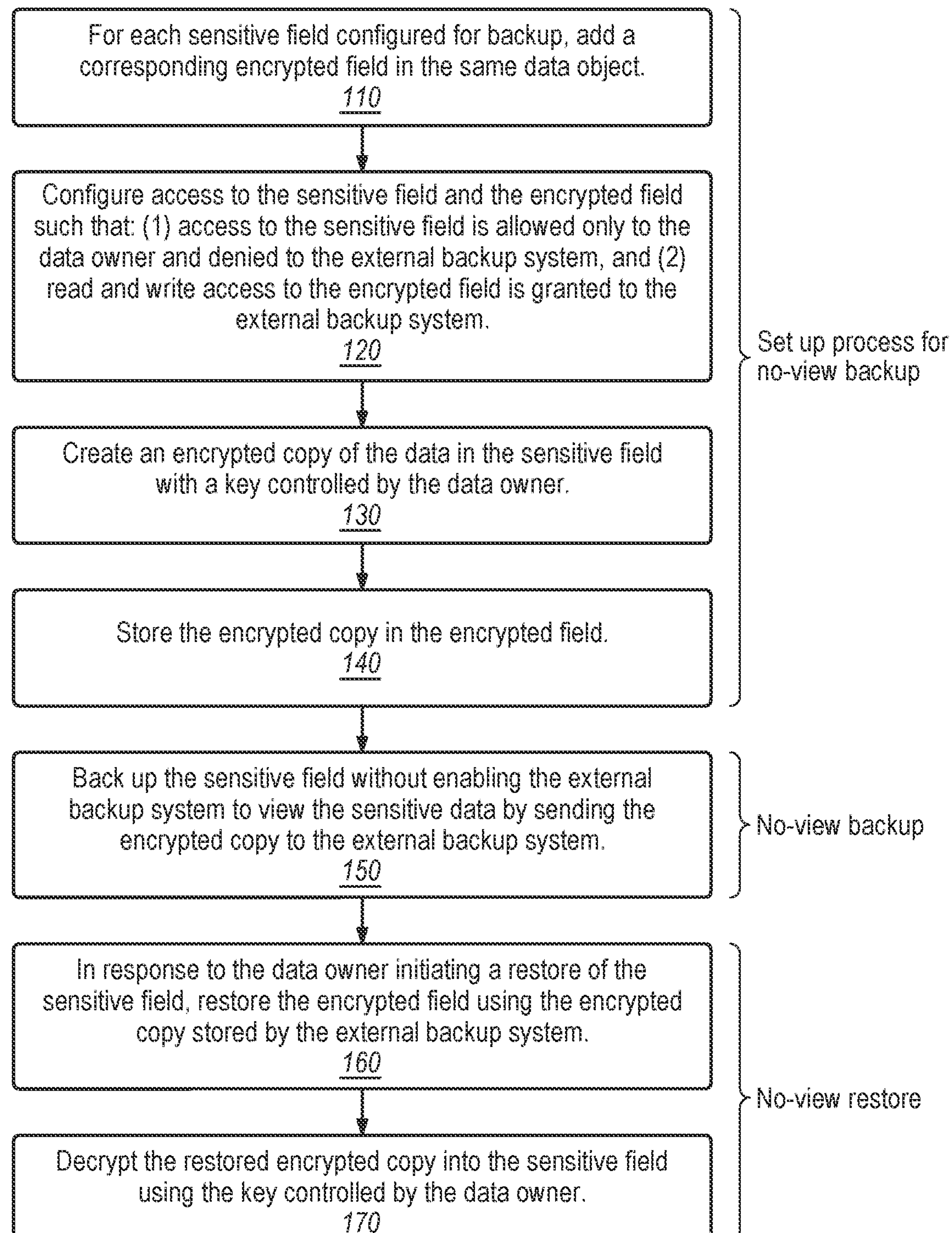
FIG. 1 is a flowchart that illustrates a method, according to one embodiment, for a no-view backup and restore for sensitive data.

FIG. 1 illustrates a method for backing up a sensitive field in a data object in a storage system using an external backup system without enabling the external backup system to view the data in the sensitive field. The data in the sensitive field belongs to a data owner, which may be an entity such as a company, person, or system. The external backup system is independent from the data owner. In certain embodiments, the storage system is part of a cloud-based, multi-tenant SaaS application platform.

In the set-up process for the no-view backup, for each sensitive field configured for backup, the system adds a corresponding encrypted field in the same data object as a sensitive field (step 110). The system configures access to the sensitive field and the encrypted field such that: (1) access to the sensitive field is allowed only to the data owner and denied to the external backup system, and (2) read and write access to the encrypted field is granted to the external backup system (step 120). The system creates an encrypted copy of the data in the sensitive field with an encryption key controlled by the data owner (step 130). The system stores the encrypted copy in the encrypted field (step 140).

In the no-view backup process, the system backs up the sensitive field without enabling the external backup system to view the data in the sensitive field by sending the encrypted copy in the encrypted field to the external backup system (step 150). The external backup system has no access to the encryption key controlled by the data owner.

In the no-view restore process, in response to the data owner initiating a restore of the sensitive field, the system restores the encrypted field using the encrypted copy stored by the external backup system (step 160). The system decrypts the restored encrypted copy into the sensitive field using the encryption key controlled by the data owner (step 170).

In certain embodiments, the encryption is symmetric encryption. In certain embodiments, the encryption is with salt (i.e., to ensure that Booleans/pick lists cannot be decrypted with statistical attacks). In certain embodiments, the system performs compliance monitoring on the access configurations of the sensitive field by testing whether external applications can read the sensitive field.

2. Example System Architecture

Figure 2:
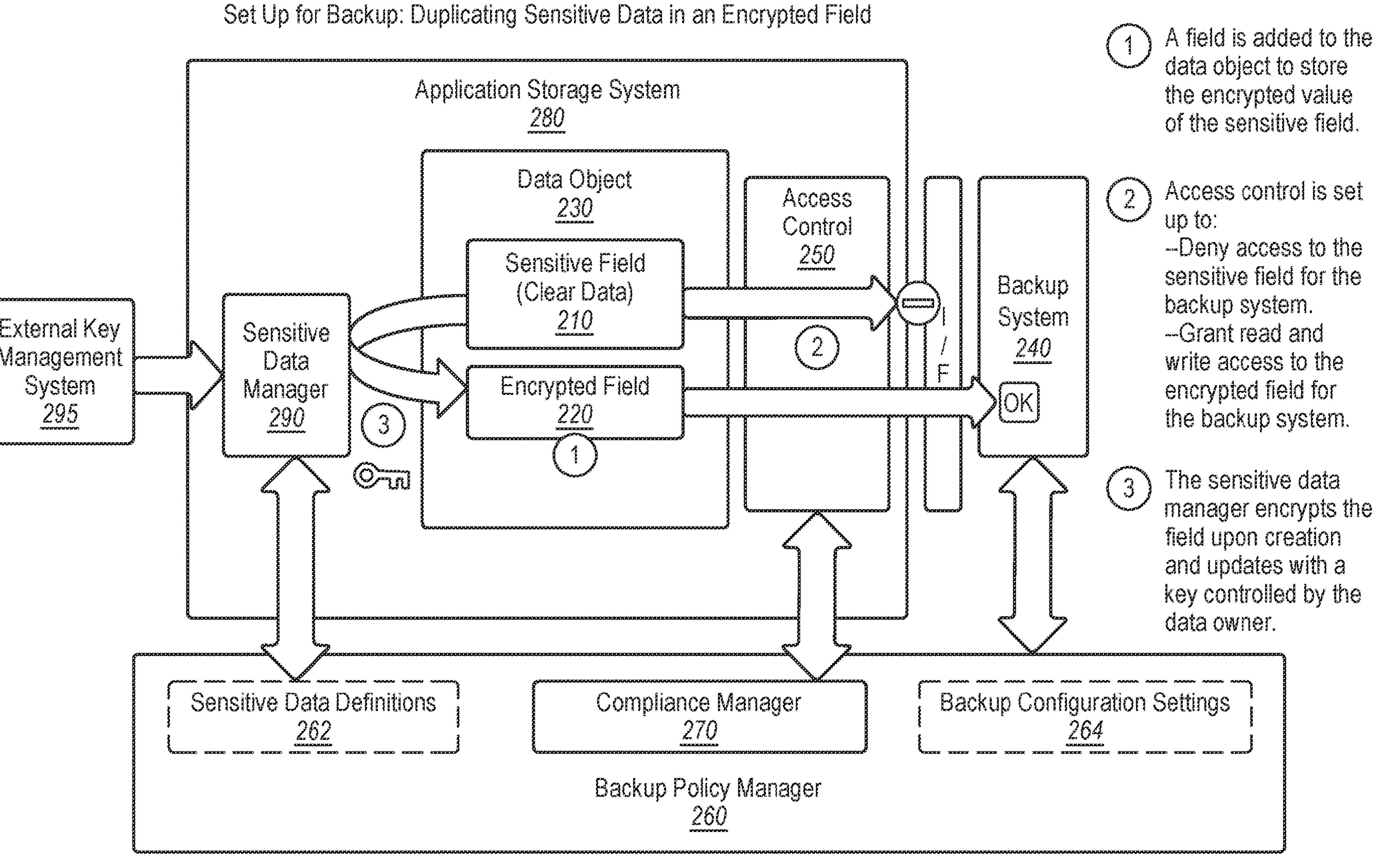
FIG. 2 is a block diagram that illustrates an example system architecture, according to one embodiment, for duplicating sensitive data in an encrypted field.
Figure 3:
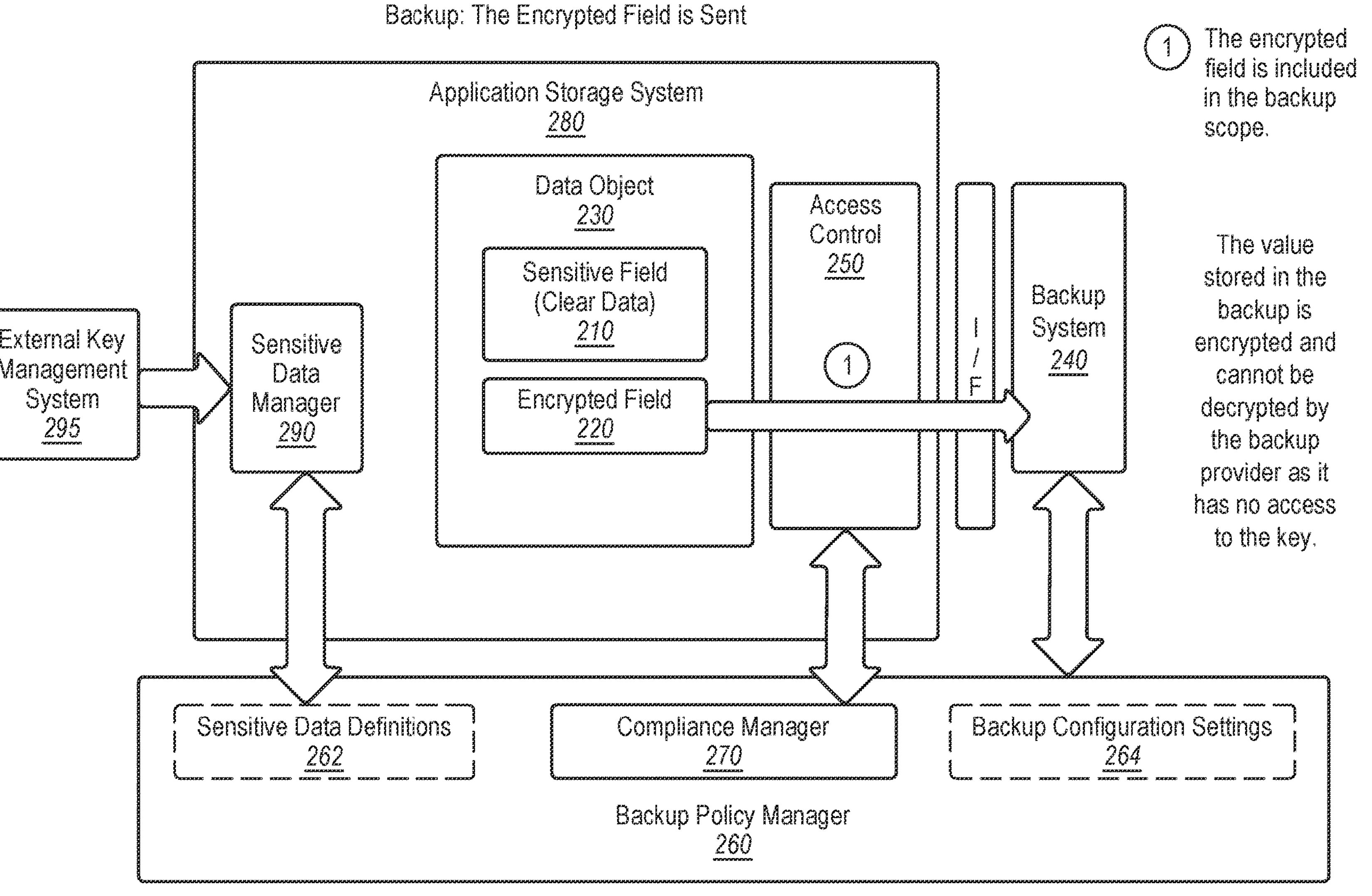
FIG. 3 is a block diagram that illustrates an example system architecture, according to one embodiment, for sending the encrypted field to the external backup system.

FIGS. 2-4 illustrate an example architecture for a system that performs the methods described herein. However, the methods described herein may be implemented in other systems and are not limited to the illustrated system.

The application storage system 280 is where data objects 230 used by the data owner are stored. The data objects may include sensitive fields 210, which contain clear, but highly confidential data. The application storage system 280 is independent from the external backup system 240. In certain embodiments, an interface assists in the communication between the application storage system 280 and the external backup system 240. In certain embodiments, the application storage system 280 is associated with a cloud-based SaaS Application, such as SALESFORCE or MICROSOFT AZURE.

The backup policy manager 260 provides an interface to the data owner that enables an administrator associated with the data owner to enter backup configuration settings 264 and to define sensitive data definitions 262. The backup policy manager 260 informs the sensitive data manager 290, which is a module that runs on the application storage system 280, and the compliance manager 270, which is a module that runs on the backup policy manager 260, of the sensitive fields 210. The compliance manager 270 checks that the sensitive fields 210 cannot be accessed by the access control module 250. The backup policy manager 260 conveys backup configuration settings 264 to the external backup system 240. The backup policy manager 260 and the compliance manager 270 are managed by the external backup system 240 provider.

The access control module 250 is controlled by the application storage system 280. It handles access to the data objects 230. It is where access control settings are stored and implemented.

The key used for encryption and decryption is provided to the sensitive data manager 290 by an external key management system 295 in response to a request from the sensitive data manager 290. In one embodiment, the sensitive data manager 290 uses the key in memory only and does not store the key after encrypting or decrypting a field. The external key management system 295 is controlled or managed by the data owner.

FIG. 2 illustrates the step in which the sensitive data is duplicated in an encrypted field 220 to set up the data for backup. As seen in step 1 of FIG. 2, the sensitive data manager 290 prepares the sensitive field 210 for backup, creates the encrypted field 220 (i.e., a field is added to the data object 230 to store the encrypted value of the sensitive field 210), and encrypts the sensitive data into the encrypted field 220.

As seen in step 2 of FIG. 2, the data owner configures the access control module 250 such that it denies access to the sensitive field 210 for the external backup system 240, but grants read and write access to the encrypted field 220 for the external backup system 240. The compliance manager 270 confirms that access to the sensitive field 210 is blocked to the external backup system 240.

As seen in step 3 of FIG. 2, the sensitive data manager 290 encrypts the field 220 upon creation and updates with a key controlled by the data owner.

FIG. 3 illustrates the step in which the encrypted field 220 is sent for backup. As seen in step 1 of FIG. 3, the encrypted field 220 is included in the backup scope and is sent to the external backup system 240. The value stored in the backup is encrypted and cannot be decrypted by the external backup system 240 provider as it has no access to the key.

FIG. 4 illustrates the step in which the encrypted field 220 is restored then decrypted. As seen in step 1 of FIG. 4, the encrypted field 220 is restored by the external backup system 240. As seen in step 2 of FIG. 4, the sensitive data manager 290 decrypts the encrypted field 220 into the sensitive field 210 using a key controlled by the data owner.

3. Alternate Embodiment

In an alternate embodiment, a system and method for extracting data from a sensitive field in a data object in a storage system using an external extraction system without enabling the external extraction system to view the data in the sensitive field is provided. The data in the sensitive field belongs to a data owner, which may be an entity such as a company, person, or system. The external extraction system is independent from the data owner.

The system sets up the sensitive field for extraction by adding an encrypted field to a data object that includes the sensitive field. The system configures access to the sensitive field and the encrypted field such that: (1) access to the sensitive field is allowed only to the data owner and denied to the external extraction system, and (2) read and write access to the encrypted field is granted to the external extraction system. The system creates an encrypted copy of the data in the sensitive field with an encryption key controlled by the data owner. The system stores the encrypted copy in the encrypted field. The system extracts data from the sensitive field without enabling the external extraction system to view the data in the sensitive field by sending the encrypted copy in the encrypted field to the external extraction system. The external extraction system has no access to the encryption key controlled by the data owner.

4. General

The methods described with respect to FIGS. 1-4 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for backing up a sensitive field in a data object in a storage system using an external backup system without enabling the external backup system to view the data in the sensitive field, wherein the data in the sensitive field belongs to a data owner and wherein the external backup system is not the data owner, the method comprising:

providing an interface to the data owner to enter backup configuration settings and to define sensitive data definitions;

receiving the backup configuration settings and the sensitive data definitions;

setting up the sensitive field for backup based at least in part on the backup configuration settings and the sensitive data definitions by performing the following:

adding an encrypted field to a data object having a plurality of fields, wherein one of the plurality of fields is the sensitive field comprising sensitive data and wherein the encrypted field corresponds to the sensitive field;

configuring access to the sensitive field and the encrypted field such that: (1) access to the sensitive field is allowed only to the data owner and denied to the external backup system; and (2) read and write access to the encrypted field is granted to the external backup system;

performing compliance monitoring on the access configurations of the sensitive field by testing whether external applications can read the sensitive field;

creating an encrypted copy of the data in the sensitive field with an encryption key controlled by the data owner;

storing the encrypted copy in the encrypted field; and backing up the sensitive field without enabling the external backup system to view the data in the sensitive field by sending the encrypted copy in the encrypted field to the external backup system, wherein the encryption key controlled by the data owner is not transmitted between the data object and the external backup system.

2. The method of claim 1, further comprising:

restoring the sensitive field from the external backup system by performing the following:

restoring the encrypted field using the encrypted copy stored by the external backup system; and decrypting the encrypted copy into the sensitive field, wherein the decryption is performed using the encryption key controlled by the data owner.

3. The method of claim 1, wherein the storage system is part of a cloud-based, multi-tenant software-as-a-service (SaaS) application platform.

4. A non-transitory computer-readable medium comprising a computer program, that, when executed by a computer system, enables the computer system to perform the following steps for backing up a sensitive field in a data object in a storage system using an external backup system without enabling the external backup system to view the data in the sensitive field, wherein the data in the sensitive field belongs to a data owner and wherein the external backup system is not the data owner, the steps comprising:

providing an interface to the data owner to enter backup configuration settings and to define sensitive data definitions;

receiving the backup configuration settings and the sensitive data definitions;

setting up the sensitive field for backup based at least in part on the backup configuration settings and the sensitive data definitions by performing the following:

adding an encrypted field to a data object having a plurality of fields, wherein one of the plurality of fields is the sensitive field comprising sensitive data and wherein the encrypted field corresponds to the sensitive field;

configuring access to the sensitive field and the encrypted field such that: (1) access to the sensitive field is allowed only to the data owner and denied to the external backup system; and (2) read and write access to the encrypted field is granted to the external backup system;

performing compliance monitoring on the access configurations of the sensitive field by testing whether external applications can read the sensitive field;

creating an encrypted copy of the data in the sensitive field with an encryption key controlled by the data owner;

storing the encrypted copy in the encrypted field; and backing up the sensitive field without enabling the external backup system to view the data in the sensitive field by sending the encrypted copy in the encrypted field to the external backup system, wherein the encryption key controlled by the data owner is not transmitted between the data object and the external backup system.

5. The non-transitory computer-readable medium of claim 4, further comprising:

restoring the sensitive field from the external backup system by performing the following:

restoring the encrypted field using the encrypted copy stored by the external backup system; and decrypting the encrypted copy into the sensitive field, wherein the decryption is performed using the encryption key controlled by the data owner.

6. The non-transitory computer-readable medium of claim 4, wherein the storage system is part of a cloud-based, multi-tenant software-as-a-service (SaaS) application platform.

7. A computer system for backing up a sensitive field in a data object in a storage system using an external backup system without enabling the external backup system to view the data in the sensitive field, wherein the data in the sensitive field belongs to a data owner and wherein the external backup system is not the data owner, the system comprising:

one or more processors;

one or more memory units coupled to the one or more processors, wherein the one or more memory units store instructions that, when executed by the one or more processors, cause the system to perform the operations of:

providing an interface to the data owner to enter backup configuration settings and to define sensitive data definitions;

receiving the backup configuration settings and the sensitive data definitions;

setting up the sensitive field for backup based at least in part on the backup configuration settings and the sensitive data definitions by performing the following:

adding an encrypted field to a data object having a plurality of fields, wherein one of the plurality of fields is the sensitive field comprising sensitive data and wherein the encrypted field corresponds to the sensitive field;

configuring access to the sensitive field and the encrypted field such that:

(1) access to the sensitive field is allowed only to the data owner and denied to the external backup system; and (2) read and write access to the encrypted field is granted to the external backup system;

performing compliance monitoring on the access configurations of the sensitive field by testing whether external applications can read the sensitive field;

creating an encrypted copy of the data in the sensitive field with an encryption key controlled by the data owner;

storing the encrypted copy in the encrypted field; and backing up the sensitive field without enabling the external backup system to view the data in the sensitive field by sending the encrypted copy in the encrypted field to the external backup system, wherein the encryption key controlled by the data owner is not transmitted between the data object and the external backup system.

8. The computer system of claim 7, further comprising:

restoring the sensitive field from the external backup system by performing the following:

restoring the encrypted field using the encrypted copy stored by the external backup system; and decrypting the encrypted copy into the sensitive field, wherein the decryption is performed using the encryption key controlled by the data owner.

9. The computer system of claim 7, wherein the storage system is part of a cloud-based, multi-tenant software-as-a-service (SaaS) application platform.

10. A method for extracting data from a sensitive field in a data object in a storage system using an external extraction system without enabling the external extraction system to view the data in the sensitive field, wherein the data in the sensitive field belongs to a data owner and wherein the external extraction system is not the data owner, the method comprising:

providing an interface to the data owner to enter extraction configuration settings and to define sensitive data definitions;

receiving the extraction configuration settings and the sensitive data definitions;

setting up the sensitive field for extraction based at least in part on the extraction configuration settings and the sensitive data definitions by performing the following:

adding an encrypted field to a data object having a plurality of fields, wherein one of the plurality of fields is the sensitive field comprising sensitive data and wherein the encrypted field corresponds to the sensitive field;

configuring access to the sensitive field and the encrypted field such that: (1) access to the sensitive field is allowed only to the data owner and denied to the external extraction system; and (2) read and write access to the encrypted field is granted to the external extraction system;

performing compliance monitoring on the access configurations of the sensitive field by testing whether external applications can read the sensitive field;

creating an encrypted copy of the data in the sensitive field with an encryption key controlled by the data owner;

storing the encrypted copy in the encrypted field; and extracting data from the sensitive field without enabling the external extraction system to view the data in the sensitive field by sending the encrypted copy in the encrypted field to the external extraction system, wherein the encryption key controlled by the data owner is not transmitted between the data object and the external extraction system.

* * * * *